(12) United States Patent
Zhao et al.

(10) Patent No.: US 10,350,657 B2
(45) Date of Patent: Jul. 16, 2019

(54) ENVIRONMENTALLY-FRIENDLY MEDICAL WASTE TREATMENT APPARATUS AND METHOD SPECIFIC TO MEDICAL INSTITUTIONS

(71) Applicant: QINGDAO BRIGHT MEDICAL MANUFACTURING CO., LTD., Qingdao, Shandong Province (CN)

(72) Inventors: Dezheng Zhao, Shandong Province (CN); Tao Zhang, Shandong Province (CN)

(73) Assignee: QINGDAO BRIGHT MEDICAL MANUFACTURING CO., LTD., Qingdao (CN)

( * ) Notice: Subject to any disclaimer, the term of this patent is extended or adjusted under 35 U.S.C. 154(b) by 0 days.

(21) Appl. No.: 15/771,806

(22) PCT Filed: Mar. 17, 2016

(86) PCT No.: PCT/CN2016/076560
§ 371 (c)(1),
(2) Date: Apr. 27, 2018

(87) PCT Pub. No.: WO2017/071149
PCT Pub. Date: May 4, 2017

(65) Prior Publication Data
US 2018/0311711 A1    Nov. 1, 2018

Related U.S. Application Data

(63) Continuation of application No. PCT/CN2016/076560, filed on Mar. 17, 2016.

(30) Foreign Application Priority Data

Oct. 30, 2015 (CN) .......................... 2015 1 0720534

(51) Int. Cl.
*B09B 1/00* (2006.01)
*B09B 3/00* (2006.01)
(Continued)

(52) U.S. Cl.
CPC ........ *B09B 3/0075* (2013.01); *B02C 19/0075* (2013.01); *B09B 3/00* (2013.01); *B09B 5/00* (2013.01); *B65F 1/00* (2013.01)

(58) Field of Classification Search
CPC ..................................................... B09C 3/0075
See application file for complete search history.

(56) References Cited

U.S. PATENT DOCUMENTS

| 6,348,174 B1 * | 2/2002 | Hall | ........................ | A61L 11/00 134/11 |
| 8,518,339 B1 * | 8/2013 | Jude | ........................ | A61L 2/202 210/173 |

(Continued)

FOREIGN PATENT DOCUMENTS

| CN | 201089615 | 7/2008 |
| CN | 102826313 | 12/2012 |

(Continued)

*Primary Examiner* — Janine M Kreck
(74) *Attorney, Agent, or Firm* — Jiwen Chen

(57) ABSTRACT

A medical waste treatment device for health-care facility includes a frame, a waste disposal device and a control system; wherein the waste disposal device comprises three or more waste disposal boxes which are arranged in a row; a feeding conveyor belt is disposed at one side of the waste disposal boxes and the feeding conveyor belt extends to positions above each of the waste disposal boxes; the feeding conveyor belt is driven by a motor; each of the waste disposal boxes is provided with a waste label identification component, a pushing component which is configured to push waste container into the waste disposal box, and a sealing component; a feeding access is opened on the top of each of the waste disposal boxes and a discharge access is opened on the bottom of each of the waste disposal boxes; a feeding access control system is provided at each of the feeding access and a discharge access control system is provided at each of the discharge access; a branch conveyor (Continued)

belt is disposed below the discharge access of the waste disposal boxes and a major conveyor belt is disposed adjacent to the branch conveyor belts; the control terminal of the motor, the waste label identification component, the pushing component, the sealing component, the feeding access control system and the discharge access control system are coupled with the central controller of the control system. The medical waste treatment device for health-care facility could avoid the collateral contamination caused by incineration, and further avoid the production of Dioxin. The medical waste treatment device could automatically identify and classify waste containers, and treat medical waste according to its category and then package and seal it.

4 Claims, 1 Drawing Sheet

(51) Int. Cl.
  *B09B 5/00* (2006.01)
  *B65F 1/00* (2006.01)
  *B02C 19/00* (2006.01)

(56) References Cited

U.S. PATENT DOCUMENTS

| | | | |
|---|---|---|---|
| 9,248,481 B1* | 2/2016 | Soto | B09B 5/00 |
| 9,302,134 B1* | 4/2016 | Nelson | A62D 3/30 |
| 2010/0234665 A1* | 9/2010 | Soto | B08B 15/02 |
| | | | 588/260 |
| 2018/0111176 A1* | 4/2018 | Miller | B09B 3/0075 |
| 2018/0132960 A1* | 5/2018 | Scibilia | A61L 11/00 |

FOREIGN PATENT DOCUMENTS

| | | |
|---|---|---|
| CN | 203624301 | 6/2014 |
| CN | 104700210 | 6/2015 |
| CN | 2204606760 | 9/2015 |
| DE | 3908186 | 3/1990 |
| DE | 202013001183 | 7/2013 |
| WO | WO-2013079795 A1 * | 6/2013 ........... B09B 3/0075 |

* cited by examiner

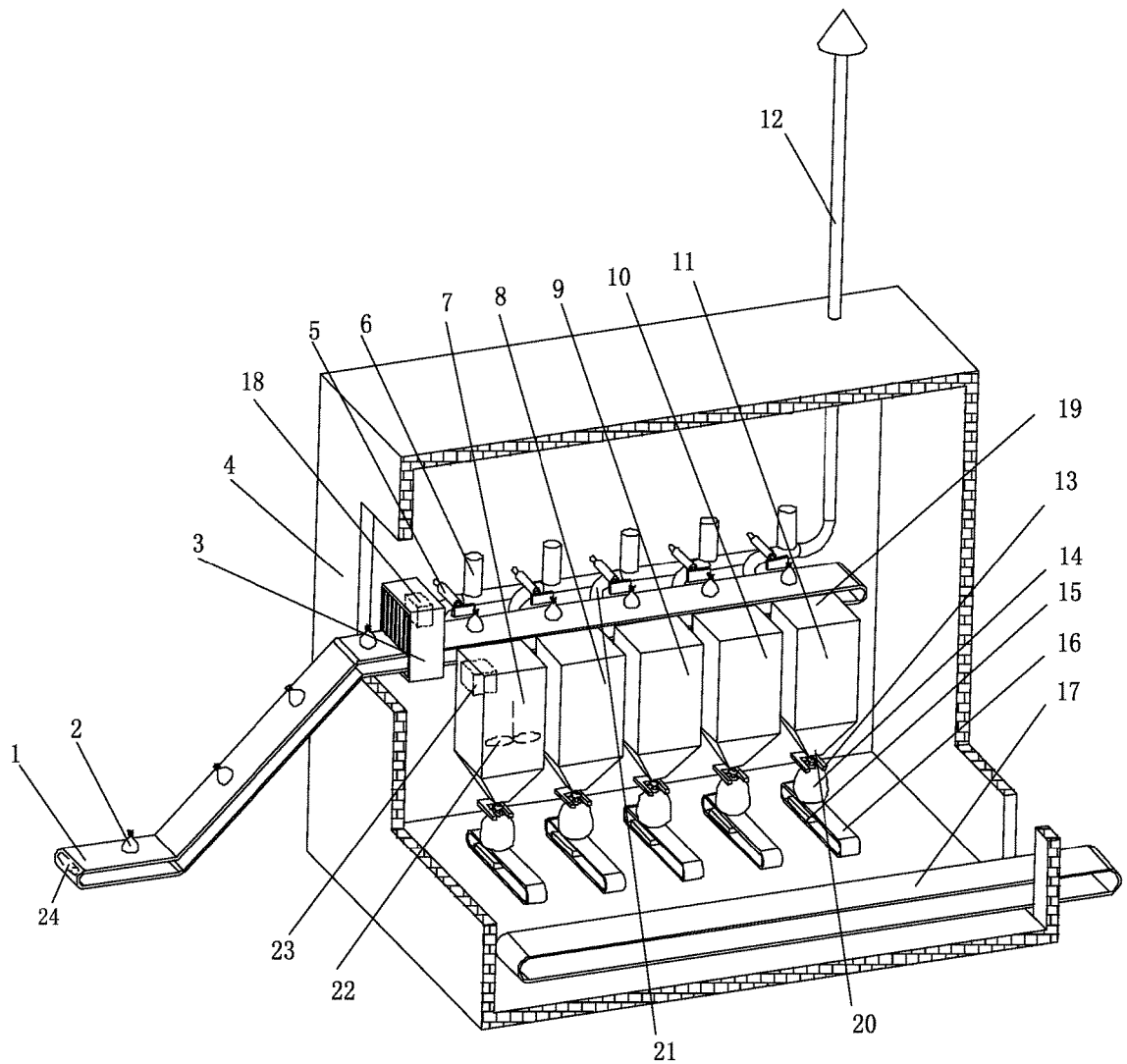

ENVIRONMENTALLY-FRIENDLY MEDICAL WASTE TREATMENT APPARATUS AND METHOD SPECIFIC TO MEDICAL INSTITUTIONS

This is a U.S. national stage application of PCT Application No. PCT/CN2016/076560 under 35 U.S.C. 371, filed Mar. 17, 2016 in Chinese, claiming priority of Chinese Application No. 201510720534.6, filed Oct. 30, 2015, all of which are hereby incorporated by reference.

TECHNICAL FIELD

The invention belongs to the technical field of waste treatment technology, and particularly, relates to a medical waste treatment device for health-care facility, and also relates to a medical waste treatment method thereof.

BACKGROUND

The term health-care waste includes all the waste generated within health-care facilities, especially in the course of their medical activities, precaution activities or other medical procedures. The waste is infectious directly or indirectly, toxic and hazardous. Normally, health-care waste is categorized as infectious waste, pathological waste, injury waste, pharmaceutical waste and chemical waste. Total generation of health-care waste in China is 1,880 to 2,800 ton per day, wherein 1,380 to 2060 ton of waste is produced in cities above county level.

Centralized Treatment facility for health-care waste has been established in Chinese cities as Shijiazhuang, Shenyang, Guangzhou, Hangzhou, Fuzhou, Nanjing, Suzhou, Nanning and Xining, other cities such as Beijing, Tianjin, Shanghai, Shenzhen, and Changsha are under construction. After the burst of SARS, the Chinese government invested enormously on hazardous waste disposal, particularly on treating medical waste. More work is planned in two years to build centralized disposal facilities in county-level regions with large populations.

Diverse forms of treatment technologies are available for health-care waste, including sanitary landfilling, high-pressure steam treatment, chemical treatment, microwave treatment and incineration. The generic kinds of incineration technology used are pyrolysis incinerators, rotary kilns, dual-chamber starved-air incinerators and plasma pyrolysis and the like.

Technical Problem

The treatment methods listed above have its own limitation on capability.

1. Sanitary landfilling may lead to further risk of environmental contamination by subsequent leak of hazardous substance.

2. High-temperature and high-pressure steam sterilization method is not capable of treating low radiological waste, organic solvents, chemotherapeutic waste, pharmacological waste and pathological waste. It is technically possible to treat small quantities of waste but may have potential for safety risk.

3. Mechanical-chemical treatment method may lead to collateral contamination and it is difficult to determine the disinfection effect. Furthermore, volatile organic compounds, chemical agents, mercury and radiological waste should not be treated in this way. In some circumstances, chlorine may be used and it is sort of hazardous at some degree. The mechanical-chemical treatment may produce liquid waste which requires to be treated through complicated process before discharge.

4. Microwave treatment method is not capable of treating pathological waste.

5. Incineration may produce collateral pollutants, especially Dioxin which could not been found in nature originally.

6. Plasma pyrolysis is a developing subclass of high-temperature incineration with complex process system with cost that is three times higher than that of typical incineration technology. The standard of plasma pyrolysis has not been well established and the requirement for operation is stringent. Wide application of plasma pyrolysis remains to be seen in future.

At present, small-scale incinerators are used to meet an immediate need for treatment of medical waste in facilities where there is no access to more sophisticated technologies, especially in hospitals. The small-scale incinerator is not a satisfying solution to avoid collateral contamination, thus there is an urgent need of waste treatment system suitable for health-care facilities.

SUMMARY OF THE INVENTION

This summary is provided to introduce a selection of concepts in a simplified form that are further described below in the Detailed Description. This summary is not intended to identify key features or essential characteristics of the claimed subject matter, nor is it intended to be used as an aid in determining the scope of the claimed subject matter.

Some example embodiments described herein generally relate to a medical waste treatment device for health-care facility, which could avoid collateral contamination and is capable of identifying, categorizing and packaging medical waste automatically; additionally, waste items could be reused where it is safe to do so.

In an example embodiment, a medical waste treatment device for health-care facility includes a frame, a waste disposal device and a control system. The waste disposal device comprises three or more waste disposal boxes which are arranged in a row. A feeding conveyor belt is disposed from one side of the waste disposal boxes and extends above each of the waste disposal boxes; the feeding conveyor belt is driven by a motor. Each of the waste disposal boxes is provided with a waste label identification component, a pushing component which is configured to push waste container falling into the waste disposal box, and a sealing component. A feeding access is opened on the top of each of the waste disposal boxes and a discharge access is opened on the bottom of each of the waste disposal boxes. A feeding access control system is provided at each of the feeding access and a discharge access control system is provided at each of the discharge access. A branch conveyor belt is disposed below the discharge access of the waste disposal boxes and a major conveyor belt is disposed adjacent to the branch conveyor belts. The control terminal of the motor, the waste label identification component, the pushing component, the sealing component, the feeding access control system and the discharge access control system are coupled with the central controller of the control system.

Further, all the waste disposal boxes are a high-temperature high-pressure shredding and resolving waste disposal box, wherein a high-temperature high-pressure steam treatment component and a shredder are arranged within the waste disposal box, a vent pipe is arranged on each of the waste disposal box and all the vent pipes of the waste boxes are communicated with a major discharge pipe.

Further, a pressure sensor is arranged on each of the branch conveyor belts, the outputs of the pressure sensors are coupled with the central controller of the control system.

Further, the waste disposal boxes includes a first waste disposal box configured to contain waste made of textile, paper or plastic material, a second waste disposal box configured to contain waste made of glass, a third waste disposal box configured to contain waste made of metal and a forth waste disposal box configured to contain pathological waste, pharmaceutical waste and chemical waste.

Further, a scanning storage component is arranged at the beginning end of the feeding conveyor belt before treatment.

A medical waste treatment method comprises: classifying and packaging medical waste into a waste container generically; attaching a label onto the waste container according to the category of the medical waste within; placing the waste container on a feeding conveyor belt and transferring the waste container to the position above waste disposal boxes by the feeding conveyor belt; scanning and identifying the label on the waste container by a waste label identification component; determining which waste disposal box to be used for treatment according to the identification result and actuating a pushing device corresponding to the elected waste disposal box to push the waste container forward until falling down into a feeding access of the elected waste disposal box, which are controlled by the central controller of a control system; actuating a corresponding high-temperature high-pressure shredding device by the central controller to resolve the medical waste; discharging the treated waste into a bag below a discharging access of the elected waste disposal box; weighing the bag by a pressure sensor; sealing the bag by an automatic sealing component; transferring the bag via a branch conveyor belt to a major conveyor belt, and then to the outside.

Further, uploading and storing the identification result including the category and quantity of the waste containers into the central controller after the identification of the label; also uploading and storing the weighing result of the pressure sensor into the central controller to facilitate data statistics.

The medical waste treatment device for health-care facility could avoid the collateral contamination caused by incineration, and further avoid the production of Dioxin.

The medical waste treatment device could automatically identify and classify waste containers, and treat medical waste according to its category and then package and seal it.

After treatment, waste items could be reused where it is safe to do so.

BRIEF DESCRIPTION OF THE DRAWING

FIG. 1 is a perspective view of a medical waste treatment for health-care facility.

DESCRIPTION OF SOME EXAMPLE EMBODIMENTS

Reference will now be made to the drawing to describe various aspects of some embodiments.

FIG. 1 includes an example medical waste treatment device for health-care facility. Specifically, the medical waste treatment device for health-care facility includes a frame, a waste disposal device and a control system 18. The waste disposal device comprises five waste disposal boxes in different categories which are arranged in a row. A feeding conveyor belt 1 is disposed from one side of the waste disposal boxes and extends above each of the waste disposal boxes; the feeding conveyor belt 1 is driven by a motor 24. Each of the waste disposal boxes is provided with a waste label identification component 6, a pushing component 5 which is configured to push waste container 2 falling down into the waste disposal box, and a sealing component 13. A feeding access 19 is opened on the top of each of the waste disposal boxes and a discharge access 20 is opened on the bottom of each of the waste disposal boxes. A feeding access control system is provided at each of the feeding access 19 and a discharge access control system is provided at each of the discharge access 20. A branch conveyor belt 16 is disposed below the discharge access 20 of the waste disposal boxes and a major conveyor belt 17 is disposed adjacent to the branch conveyor belts.

The control terminal of the motor 24, the waste label identification component 6, the pushing component 5, the sealing component 13, the feeding access control system and the discharge access control system are coupled with the central controller of the control system 18.

Specifically, the waste disposal box is a high-temperature high-pressure shredding and resolving waste disposal box, wherein a high-temperature high-pressure steam treatment component 23 and a shredder 22 are arranged within the waste disposal box, a vent pipe 21 is arranged on each of the waste disposal box and all the vent pipes of the waste boxes are communicated with a major discharge pipe 12. A pressure sensor 15 is arranged on each of the branch conveyor belts 16, the outputs of the pressure sensors 16 are coupled with the control system 18.

The waste disposal boxes includes a first waste disposal box 7 configured to contain waste made of textile, paper or plastic material, a second waste disposal box 8 configured to contain waste made of glass, a third waste disposal box 9 configured to contain waste made of metal, a forth waste disposal box 10 configured to contain pathological waste, pharmaceutical waste and chemical waste, and a fifth waste disposal box 11 configured to contain other types of waste.

In order to record and store information of the medical waste, a scanning storage component 3 is arranged at the beginning end of the feeding conveyor belt 1 before treatment.

The medical waste treatment device is installed in a noisy-proof treatment plant 4 in use, one end of the major discharge pipe protrudes from the roof of the noisy-proof treatment plant 4.

The present invention also provides an example medical waste treatment method using the medical waste treatment device described above.

The medical waste treatment method comprises: classifying and packaging medical waste into a waste container 2 generically; attaching a label onto the waste container 2 according to the category of the medical waste within; placing the waste container 2 on a feeding conveyor belt 1 and transferring the waste container to the position above waste disposal boxes by the feeding conveyor belt; scanning and identifying the label on the waste container 2 on the feeding conveyor belt 1 by a waste label identification component 6; determining which waste disposal box to be used for treatment according to the identification result and actuating a pushing device 5 corresponding to the elected waste disposal box to push the waste container forward into a feeding access 19 of the elected waste disposal box, which are controlled by the central controller of a control system 18; actuating a corresponding high-temperature high-pressure shredding device by the central controller to resolve the medical waste; discharging the treated waste into a bag 14 below a discharging access of the elected waste disposal box; weighing the bag by a pressure sensor 15; sealing the bag 14 by an automatic sealing component 13; transferring the bag via a branch conveyor belt 16 to a major conveyor belt 17, and then to the outside.

The method further comprises: uploading and storing a scanning result including the category and quantity of the waste containers into the central controller before treatment, which is collected by a scanning storage component 3 before the waste label identification component 6 scans the waste container 2; also uploading and storing the weighing result of the pressure sensor about the waste container 2 after treatment into the central controller to facilitate data statistics.

The present invention does not involve the treatment of radioactive waste, and generally not use to treat medical equipment, appliances, elements, or batteries.

The present invention may be embodied in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A medical waste treatment device for health-care facility comprises a frame, a waste disposal device and a control system; wherein the waste disposal device comprises four or more waste disposal boxes which are arranged in a row; a feeding conveyor belt is disposed from one side of the waste disposal boxes and extend above each of the waste disposal boxes; the feeding conveyor belt is driven by a motor; each of the waste disposal boxes is provided with a waste label identification component, a pushing component which is configured to push a waste container so that it falls down into the waste disposal box, and a sealing component; a feeding access is opened on the top of each of the waste disposal boxes and a discharge access is opened on the bottom of each of the waste disposal boxes; a feeding access control system is provided at each of the feeding access and a discharge access control system is provided at each of the discharge access; a branch conveyor belt is disposed below the discharge access of the waste disposal boxes and a major conveyor belt is disposed adjacent to the branch conveyor belts; the control terminal of the motor, the waste label identification component, the pushing component, the sealing component, the feeding access control system and the discharge access control system are coupled with a central controller of the control system;

wherein the waste disposal box is a high-temperature high-pressure shredding and resolving waste disposal box, wherein a high-temperature high-pressure steam treatment component and a shredder are arranged within the waste disposal box, a vent pipe is arranged on each of the waste disposal box and all the vent pipes of the waste boxes are communicated with a major discharge pipe;

wherein a pressure sensor is arranged on each of the branch conveyor belts, the outputs of the pressure sensors are coupled with the central controller of the control system; and the waste disposal boxes includes a first waste disposal box configured to contain waste made of textile, paper or plastic material, a second waste disposal box configured to contain waste made of glass, a third waste disposal box configured to contain waste made of metal and a forth waste disposal box configured to contain pathological waste, pharmaceutical waste and chemical waste.

2. The medical waste treatment device for health-care facility according to claim 1, a scanning storage component is arranged at the beginning end of the feeding conveyor belt before treatment.

3. A medical waste treatment method using the medical waste treatment device for health-care facility according to claim 2, comprises: classifying and packaging medical waste into a waste container generically; attaching a label onto the waste container according to the category of the medical waste within; placing the waste container on a feeding conveyor belt and transferring the waste container to the position above waste disposal boxes by the feeding conveyor belt; scanning and identifying the label on the waste container by a waste label identification component; determining the one waste disposal box to be used for treatment according to the identification result and actuating a pushing device corresponding to the elected waste disposal box to push the waste container forward into a feeding access of the elected waste disposal box, which are controlled by the central controller of a control system; actuating a corresponding high-temperature high-pressure shredding device by the central controller to resolve the medical waste; discharging the treated waste into a bag below a discharging access of the elected waste disposal box; weighing the bag by a pressure sensor; sealing the bag by an automatic sealing component; transferring the bag via a branch conveyor belt to a major conveyor belt, and then to the outside.

4. The medical waste treatment method according to claim 3, wherein uploading and storing the identification result including the category and quantity of the waste containers into the central controller after the identification of the label; also uploading and storing the weighing result of the pressure sensor into the central controller.

* * * * *